US008795883B2

(12) United States Patent
Shin et al.

(10) Patent No.: US 8,795,883 B2
(45) Date of Patent: Aug. 5, 2014

(54) SECONDARY BATTERY WITH ADVANCED SAFETY

(75) Inventors: Youngjoon Shin, Daejeon (KR); Min Su Kim, Daejeon (KR); Junill Yoon, Seoul (KR); Ji Heon Ryu, Seoul (KR); Jeong Hee Choi, Busan (KR); Seung-Jin Yang, Yongin-si (KR)

(73) Assignee: LG Chem, Ltd. (KR)

( * ) Notice: Subject to any disclaimer, the term of this patent is extended or adjusted under 35 U.S.C. 154(b) by 638 days.

(21) Appl. No.: 11/555,743

(22) Filed: Nov. 2, 2006

(65) Prior Publication Data

US 2007/0202399 A1     Aug. 30, 2007

(30) Foreign Application Priority Data

Nov. 8, 2005 (KR) ........................ 10-2005-0106296

(51) Int. Cl.
*H01M 2/02* (2006.01)
*H01M 2/08* (2006.01)

(52) U.S. Cl.
USPC .......................................... 429/181; 429/185

(58) Field of Classification Search
USPC ................................. 429/178, 181
See application file for complete search history.

(56) References Cited

U.S. PATENT DOCUMENTS

| 6,537,704 | B1 | 3/2003 | Akashi et al. | |
| 2002/0031703 | A1* | 3/2002 | Kameyama et al. | 429/162 |
| 2002/0146620 | A1* | 10/2002 | Connell | 429/161 |
| 2003/0113618 | A1* | 6/2003 | Xing et al. | 429/129 |
| 2003/0232243 | A1* | 12/2003 | Hong | 429/161 |
| 2004/0038125 | A1 | 2/2004 | Kim et al. | |
| 2004/0038126 | A1* | 2/2004 | Gu | 429/162 |
| 2004/0161662 | A1* | 8/2004 | Kim et al. | 429/94 |

FOREIGN PATENT DOCUMENTS

| CN | 1466236 | 1/2004 |
| CN | 2785153 Y | 5/2006 |
| EP | 1369939 | 12/2003 |
| JP | 11233133 | 8/1999 |
| JP | 2004-063278 A | 2/2004 |
| KR | 10-2001-0082058 | 8/2001 |
| KR | 10-2001-0082059 | 8/2001 |
| KR | 10-2001-0082060 | 8/2001 |
| KR | 1020010082058 | 8/2001 |
| KR | 1020010082059 | 8/2001 |
| KR | 1020010082060 | 8/2001 |

* cited by examiner

*Primary Examiner* — Barbara Gilliam
*Assistant Examiner* — Stephan Essex
(74) *Attorney, Agent, or Firm* — Lerner, David, Littenberg, Krumholz & Mentlik, LLP

(57) ABSTRACT

Disclosed herein is a secondary battery constructed in a structure in which an electrode assembly having a cathode/separator/anode arrangement is mounted in a battery case made of a laminate sheet including a resin layer and a metal layer, electrode tabs of the electrode assembly are coupled to corresponding electrode leads, and the electrode assembly is sealed in the battery case while electrode leads are exposed to the outside of the battery case, wherein a protective film is attached to coupling regions between the electrode tabs and the electrode leads for sealing the coupling regions between the electrode tabs and the electrode leads. The secondary battery according to the present invention is constructed in a structure in which the coupling regions are sealed by the protective film, unlike a conventional secondary battery constructed in a structure in which the coupling regions between the electrode tabs and the electrode leads are exposed in the battery case. As a result, the electrode leads are protected from external impacts, such as falling of the battery. Consequently, no internal short circuit occurs, and therefore, the safety of the battery is increased.

15 Claims, 3 Drawing Sheets

SECONDARY BATTERY WITH ADVANCED SAFETY

CROSS REFERENCE TO RELATED APPLICATION

The present application claims priority from Korean Patent Application No. 10-2005-0106296 filed on Nov. 8, 2005, the disclosure of which is hereby incorporated herein by reference.

FIELD OF THE INVENTION

The present invention relates to a secondary battery with improved safety, and, more particularly, to a secondary battery constructed in a structure in which an electrode assembly having a cathode/separator/anode arrangement is mounted in a battery case made of a laminate sheet including a resin layer and a metal layer, electrode tabs of the electrode assembly are coupled to corresponding electrode leads, and the electrode assembly is sealed in the battery case while electrode leads are exposed to the outside of the battery case, wherein a protective film is attached to coupling regions between the electrode tabs and the electrode leads for sealing the coupling regions between the electrode tabs and the electrode leads, and therefore, the coupling regions are sealed by the protective film, unlike a conventional secondary battery constructed in a structure in which the coupling regions between the electrode tabs and the electrode leads are exposed in the battery case, whereby the electrode leads are protected from external impacts, such as falling of the battery with the result that no internal short circuit occurs, and therefore, the safety of the battery is increased.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and voltage, extended service-life, and low self discharge rate, which has been commercialized and widely used.

Based on the construction of electrodes and an electrolyte, the lithium secondary battery may be classified as a lithium-ion battery, a lithium-ion polymer battery, or a lithium polymer battery. Among them, the lithium-ion polymer battery has been increasingly used because the lithium-ion polymer battery has a low possibility of electrolyte leakage and can be easily manufactured. The lithium-ion polymer battery (LiPB) is constructed in a structure in which an electrode assembly manufactured by thermally welding electrodes (cathodes and anodes) and separators is impregnated with an electrolyte. Mostly, the lithium-ion polymer battery is constructed in a structure in which a stacking type electrode assembly is mounted in a pouch-shaped case made of an aluminum laminate sheet in a sealed state. For this reason, the lithium-ion polymer battery is often referred to as a pouch-shaped battery.

FIGS. 1 and 2 typically illustrate a general structure of a representative lithium-ion polymer battery including a stacking type electrode assembly.

Referring to these drawings, a lithium-ion polymer battery 100 is constructed in a structure in which an electrode assembly 300 including cathodes, anodes, and separators disposed respectively between the cathodes and the anodes is mounted in a pouch-shaped battery case 200, cathode and anode tabs 301 and 302 of the electrode assembly 300 are welded to two electrode leads 400 and 410, respectively, and the electrode assembly 300 is sealed in the battery case 200 while electrode leads 400 and 410 are exposed to the outside of the battery case 200.

The battery case 200 is made of a soft wrapping material, such as an aluminum laminate sheet. The battery case 200 includes a case body 210 having a hollow receiving part 230 for receiving the electrode assembly 300 and a cover 220 connected to the case body 210 at one side thereof.

The electrode assembly 300 of the lithium-ion polymer battery 100 may be constructed in a jelly-roll type structure in addition to the stacking type structure shown in FIG. 1. The stacking type electrode assembly 300 is constructed in a structure in which the cathode tabs 301 and the anode tabs 302 are welded to the electrode leads 400 and 410, respectively, and insulative films 500 are attached to the upper and lower surfaces of the electrode leads 400 and 410 for securing electrical insulation and sealability between the electrode leads 400 and 410 and the battery case 200.

When a lithium secondary battery, such as the lithium-ion polymer battery, is exposed to high temperature, or when a large amount of current flows in a short time due to overdischarge, an external short circuit, a nail penetration, a local crush, or a drop-induced short circuit, the battery is heated due to IR heat generation with the result that the battery may catch fire or explode. As the temperature of the battery is increased, the reaction between the electrolyte and the electrodes is accelerated. As a result, heat of reaction is generated, and therefore, the temperature of the battery is further increased, which accelerates the reaction between the electrolyte and the electrodes. As a result, the temperature of the battery is sharply increased, and therefore, the reaction between the electrolyte and the electrodes is accelerated. This vicious cycle causes a thermal runaway phenomenon in which the temperature of the battery is sharply increased. When the temperature of the battery is increased to a predetermined temperature level, the battery may catch fire. Also, as a result of the reaction between the electrolyte and the electrodes, gas is generated, and therefore, the internal pressure of the battery is increased. When the internal pressure of the battery is increased to a predetermined pressure level, the lithium secondary battery may explode. This possibility that the lithium secondary battery catches fire and explodes is the most fatal disadvantage of the lithium secondary battery.

Especially, the battery case of the lithium-ion polymer battery is made of a soft wrapping material having low strength. As a result, the battery case of the lithium-ion polymer battery is easily deformed when the battery falls or external impacts are applied to the battery. As shown in FIG. 2, a space 230a is provided at the upper end of the electrode assembly 300 in the battery case 200 such that the electrode tabs of the electrode assembly are connected to the electrode leads 400 and 410 by welding. Consequently, when external impacts are applied to the battery at the upper end of the battery due to the falling of the battery, the electrode assembly 300 is moved toward the space 230a formed at the upper end of the electrode assembly 300, and, therefore, the welded parts (mainly, the cathode region) of the electrode leads 400 and 410 are brought into contact with the outermost electrodes (mainly, anode electric collectors) of the electrode assembly 300 or the upper end of the electrode assembly 300 with the result that an internal short circuit may occur. The falling of the battery frequently occurs during the use of the battery. Consequently, the demand of a technology for more efficiently securing the safety of the battery is very high.

Some conventional arts propose a method of attaching adhesive tape to predetermined positions of the electrode assembly and a method of filling the space formed at the upper end of the electrode assembly with a foreign material, in order to prevent the occurrence of the internal short circuit due to the movement of the electrode assembly. However, these methods have a problem in that the adhesive tape and the foreign material chemically react with the electrolyte, and therefore, the performance of the battery is reduced.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when not only the contact regions between the electrode leads and the battery case but also the coupling regions between the electrode tabs and the electrode leads are sealed by a protective film, and preferably, the electrode tabs extend a long distance from the upper ends of electrode current collectors such that the coupling regions are spaced apart from the electrode assembly, the occurrence of an internal short circuit is effectively prevented while the separators are not damaged due to the protection film. The present invention has been completed based on these findings.

In accordance with the present invention, the above and other objects can be accomplished by the provision of a secondary battery constructed in a structure in which an electrode assembly having a cathode/separator/anode arrangement is mounted in a battery case made of a laminate sheet including a resin layer and a metal layer, electrode tabs of the electrode assembly are coupled to corresponding electrode leads, and the electrode assembly is sealed in the battery case while electrode leads are exposed to the outside of the battery case, wherein a protective film is attached to coupling regions between the electrode tabs and the electrode leads for sealing the coupling regions between the electrode tabs and the electrode leads.

The experiments carried out by the inventors of the present invention revealed that an internal short circuit due to the movement of an electrode assembly in a battery having the electrode assembly mounted in a battery case made of a laminate sheet occurs mainly when the coupling regions between the electrode tabs and the electrode leads are brought into contact with the electrode assembly, especially the outermost electrodes of the electrode assembly. In the secondary battery according to the present invention, therefore, the protective film is attached to the coupling regions between the electrode tabs and the electrode leads, i.e., the lower ends of the electrode leads or the upper ends of the electrode tabs for preventing the contact between the coupling regions and the electrode assembly, thereby improving the safety of the battery.

The electrode assembly having a structure in which the electrode tabs are coupled with the corresponding electrode leads may be a stacking type electrode assembly constructed in a structure in which a plurality of cathodes and a plurality of anodes are stacked while a plurality of separators are disposed respectively between the cathodes and the anodes or a stacking/folding type electrode assembly constructed in a structure in which a plurality of cathodes and a plurality of anodes are stacked and folded while a plurality of separators are disposed respectively between the cathodes and the anodes. In such an electrode assembly, a plurality of electrode tabs (cathode tabs or anode tabs) are coupled with an electrode lead (a cathode lead or an anode lead) by welding. The details of the stacking/folding type electrode assembly are disclosed in Korean Unexamined Patent Publication No. 2001-0082058, No. 2001-0082059, and No. 2001-0082060, which have been filed in the name of the applicant of the present patent application. The disclosures of the above-mentioned patent publications are hereby incorporated by reference as if fully set forth herein.

In the stacking type or stacking/folding type electrode assembly, the coupling regions mean welded parts, and the protective film attached to the welded parts has a size sufficient to sealing the welded parts.

Preferably, the sealing of the coupling regions (the welded parts) between the electrode tabs and the electrode leads through the attachment of the protective film is accomplished by attaching two-unit film members to each other while the welded parts are interposed between the two-unit film members or winding one-unit film members on the two welded parts, respectively. In the latter case, the film members are wound on the coupling regions preferably 4 times or less, more preferably 1 to 3 times in order to maximally restrain the increase in volume of the battery due to the film members.

In the battery having the above-described electrode assembly mounted therein, on the other hand, an insulative film is generally attached to the contact regions between the electrode leads and the battery case, as previously described with reference to FIGS. 1 and 2. In this case, the protective film may be disposed at the lower end of the insulative film while the protective film is adjacent to or spaced apart from the insulative film.

According to circumstances, the insulative film, which is attached to the contact regions between the electrode leads and the battery case, may extend by a length sufficient to seal the coupling regions between the electrode tabs and the electrode leads, thereby also serving as the protective film.

The insulative film may be separately attached to each electrode lead, or the insulative film may be a one-unit member simultaneously attached to the two electrode leads. Also, the protective film may be separately attached to each coupling region, or the protective film may be a one-unit member simultaneously attached to the two coupling regions.

Preferably, the protective film has a width equal to or slightly greater than that of the welded parts. Also preferably, the protective film has a width equal to or slightly greater than that of the insulative film. When the one-unit film members are wound on the welded parts, on the other hand, it is more preferable for the film members to have a width less than that of the insulative film.

The protective film is not particularly restricted so long as the protective film is made of an insulative material that does not affect the operation of the battery. For example, the protective film may be made of a polypropylene (PP)-based polymer material. Also, the protective film may be made of the same material as the insulative film.

In a preferred embodiment, the electrode tabs extend from the upper ends of electrode current collectors by a predetermined length so as to prevent the separators from being damaged due to the protective film.

In this case, it is preferable that the extended length be 5 to 10 mm.

The battery according to the present invention is not particularly restricted so long as the battery has the above-described internal structure. Preferably, the present invention is applied to the aforesaid lithium-ion polymer battery.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
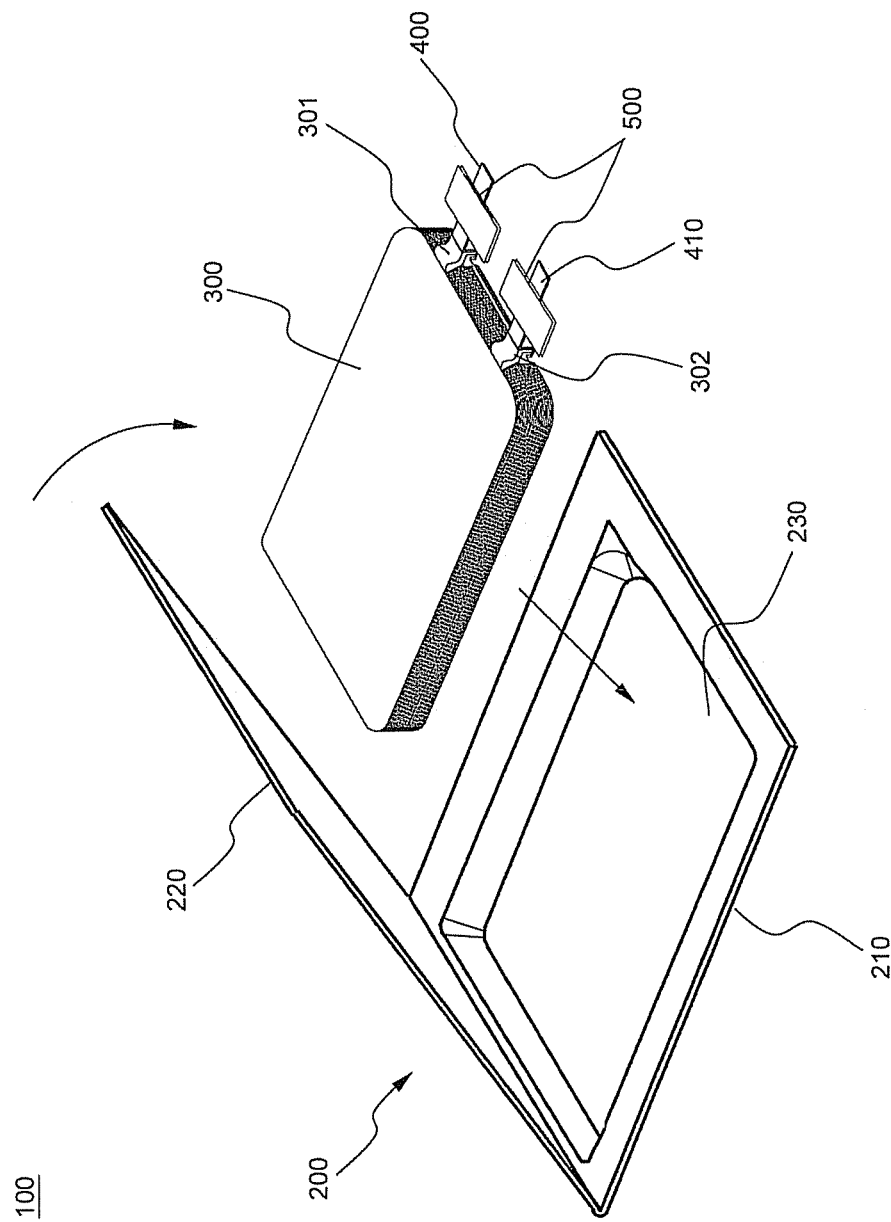
FIGS. 1 and 2 are a perspective view and a plan see-through view of a conventional lithium-ion polymer battery using a pouch-shaped battery case, illustrating a process for assembling the battery case and an electrode assembly and the lithium-ion polymer battery after the assembly of the battery case and the electrode assembly, respectively.
Figure 2:
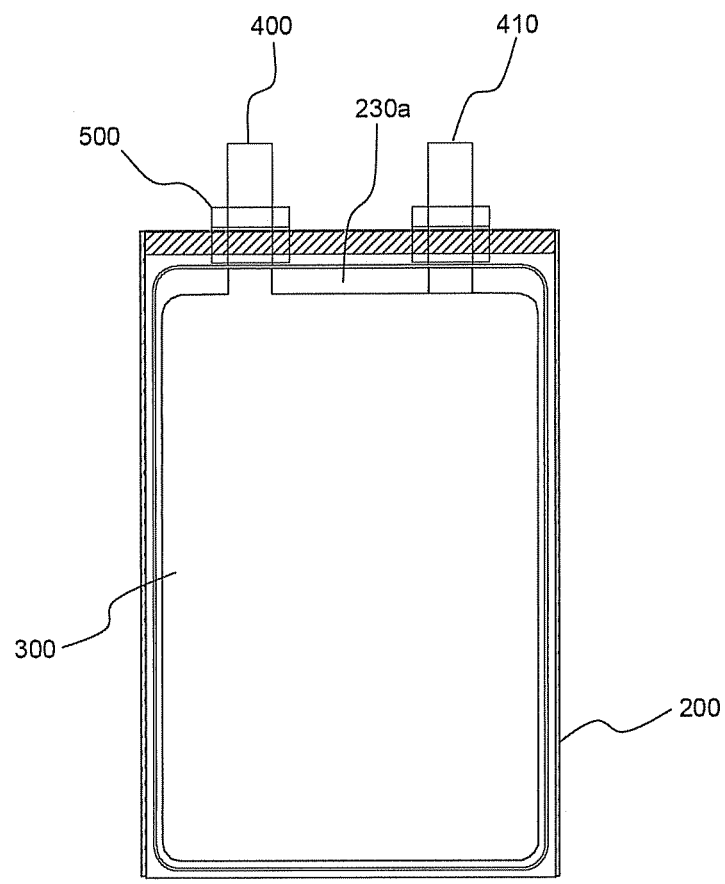
Figure 3:
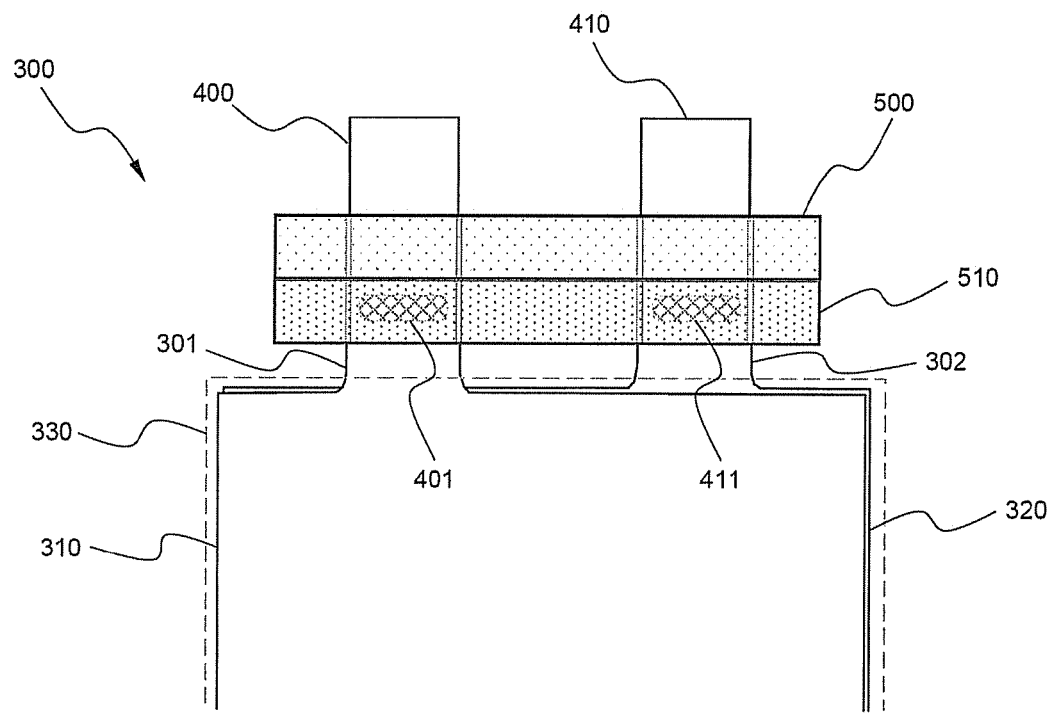
FIG. 3 is a plan view typically illustrating the upper end of an electrode assembly of a secondary battery according to a preferred embodiment of the present invention.
Figure 4:
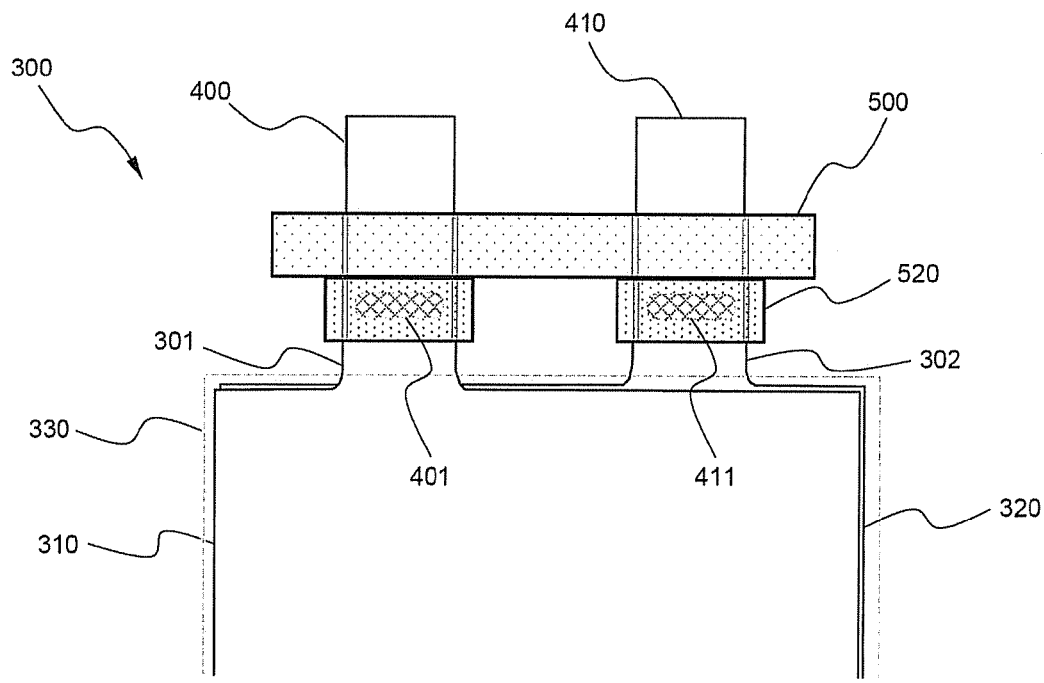
FIG. 4 is a plan view typically illustrating the upper end of an electrode assembly of a secondary battery according to another preferred embodiment of the present invention.

FIG. 3 is a plan view typically illustrating the upper end of an electrode assembly of a secondary battery according to a preferred embodiment of the present invention, and FIG. 4 is a plan view typically illustrating the upper end of an electrode assembly of a secondary battery according to another preferred embodiment of the present invention.

Referring to these drawings, an electrode assembly 300, which is constructed in a structure in which separators 330 are disposed respectively between cathode current collectors 310 having an electrode active material applied to opposite major surfaces thereof and anode current collectors 320 having an electrode active material applied to opposite major surfaces thereof, has cathode tabs 301 and anode tabs 302, which protrude from the upper ends of the respective current collectors 310 and 320.

The electrode assembly 300 includes pluralities of anodes and cathodes. The cathode tabs 301 and the anode tabs 302 are securely fixed to a cathode lead 400 and an anode lead 410, respectively, by welding. Consequently, welded parts 401 and 411 are formed at the lower ends of the electrode leads 400 and 410 and the upper ends of the electrode tabs 301 and 302.

The welded parts 401 and 411 are brought into contact with the upper end of the electrode assembly 300 or the outermost electrodes (mainly, the anode current collectors 320), for example, when the battery falls with the result that the electrode assembly 300 is moved, whereby an internal short circuit occurs. According to the present invention, a protective film 510 or 520 is attached to the welded parts 401 and 411 for sealing the welded parts 401 and 411.

The attachment of the protective film 510 and 520 will be described. Referring first to FIG. 3, the protective film 510 includes two-unit film members attached to each other while the welded parts 401 and 411 are interposed between the two-unit film members. The protective film 510 is disposed at the lower end of an insulative film 500, which is attached to the electrode leads 400 and 410, such that the protective film 510 is adjacent to the insulative film 500, while the protective film 510 is formed in the same shape as the insulative film 500. In order to accomplish such attachment, adhesive is applied to one or two of the opposite surfaces of the film members. This adhesive may include a composition coupled by a bonding method or a thermally welding method.

According to circumstances, the protective film 510 may be attached to the cathode lead 400 and the anode lead 410 at the same time in the form of the same one-unit member as the insulative film 500.

Another example is illustrated in FIG. 4. Referring to FIG. 4, the protective films 520 include one-unit film members wound on the welded parts 401 and 411, respectively. The protective films 520 are separately disposed at the lower end of the insulative film 500, which are attached to the electrode leads 400 and 410, for wrapping the welded parts 401 and 411, respectively.

Referring back to FIGS. 3 and 4, the electrode leads 400 and 410 may be welded to the electrode tabs 301 and 302, respectively, while the insulative film 500 is previously attached to predetermined positions of the electrode leads 400 and 410. Alternatively, the insulative film 500 may be attached to the electrode leads 400 and 410 after the electrode leads 400 and 410 are welded to the electrode tabs 301 and 302, respectively.

The electrode tabs 301 and 302 extend somewhat a long distance from the corresponding electrode current collectors 310 and 320. As a result, the welded parts 401 and 411 are spaced apart from the upper ends of the electrode current collectors 310 and 320 by the extended distance. Consequently, the protective film 510 or 520 for sealing the welded parts 401 and 411 does not damage the separators 330 of the electrode assembly 300, whereby the battery is provided with high safety.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the secondary battery according to the present invention is constructed in a structure in which not only the contact regions between the electrode leads and the battery case but also the coupling regions between the electrode tabs and the electrode leads are sealed by the protective film, and therefore, the coupling regions are more securely maintained, and the occurrence of an internal short circuit is prevented when the battery falls or external impacts are applied to the battery. Consequently, the safety of the battery is improved.

What is claimed is:

1. A secondary battery constructed in a structure in which an electrode assembly having a cathode/separator/anode arrangement is mounted in a battery case made of a laminate sheet including a resin layer and a metal layer, electrode tabs of the electrode assembly are coupled to corresponding electrode leads, and the electrode assembly is sealed in the battery case while electrode leads are exposed to the outside of the battery case, wherein a protective film is attached to coupling regions between the electrode tabs and the electrode leads for sealing the coupling regions between the electrode tabs and the electrode leads;

the electrode assembly is a stacking type or a stacking/folding type electrode assembly including a structure in which a plurality of cathodes and a plurality of anodes are stacked while a plurality of separators are disposed respectively between the cathodes and the anodes, and a plurality of electrode tabs (cathode tabs or anode tabs)

are coupled with an electrode lead (a cathode lead or an anode lead) by welding, the battery being a pouch type battery;

the electrode tabs extend from the upper ends of electrode current collectors by a length of 5 to 10 mm that is sufficient to prevent the separators from being damaged by the protective film; and the separators have a width dimension of about 3.1 cm and a length dimension of about 4.5 cm.

2. The secondary battery according to claim 1, wherein the protective film includes two-unit film members attached to each other while the coupling regions are interposed between the two-unit film members.

3. The secondary battery according to claim 1, wherein the protective film includes one-unit film members wound on the coupling regions, respectively.

4. The secondary battery according to claim 1, wherein the protective film has a length sufficient to wrap the welded part.

5. The secondary battery according to claim 1, wherein an insulative film is attached to the contact regions between the electrode leads and the battery case, the protective film being disposed at the lower end of the insulative film.

6. The secondary battery according to claim 1, wherein an insulative film is attached to the contact regions between the electrode leads and the battery case, the insulative film extending by a length sufficient to wrap the coupling regions between the electrode tabs and the electrode leads, thereby forming the protective film.

7. The secondary battery according to claim 5, wherein the insulative film is a one-unit member simultaneously attached to the two electrode leads.

8. The secondary battery according to claim 2, wherein the protective film is separately attached to each coupling region.

9. The secondary battery according to claim 1, wherein the protective film is made of a polypropylene (PP)-based polymer material.

10. The secondary battery according to claim 1, wherein the battery is a lithium-ion polymer battery.

11. The secondary battery according to claim 1, wherein the electrode tabs have a width substantially equal to that of the electrode leads.

12. The secondary battery according to claim 5, wherein the insulative film is separately attached to each electrode lead.

13. The secondary battery according to claim 1, wherein the protective film has a width substantially equal to that of the welded regions.

14. The secondary battery according to claim 2, wherein the protective film is a one-unit member simultaneously attached to the two coupling regions.

15. The secondary battery according to claim 1, wherein the plurality of cathodes, the plurality of anodes, and the plurality of separators of the electrode assembly are stacked in a first direction, and wherein the electrode tabs extend substantially within a plane that is substantially perpendicular to the first direction.

* * * * *